US012479175B2

(12) United States Patent
Tsouroukidou et al.

(10) Patent No.: US 12,479,175 B2
(45) Date of Patent: Nov. 25, 2025

(54) TIRE REPAIR APPARATUS FOR ATTACHMENT TO A VEHICLE WHEEL

(71) Applicant: KT PROJEKTENTWICKLUNGS-GMBH, Heilbronn (DE)

(72) Inventors: Eleni Tsouroukidou, Pfullendorf (DE); Konstantin Tsiberidis, Untergruppenbach (DE)

(73) Assignee: KT PROJEKTENTWICKLUNGS-GMBH, Heilbronn (DE)

( * ) Notice: Subject to any disclaimer, the term of this patent is extended or adjusted under 35 U.S.C. 154(b) by 0 days.

(21) Appl. No.: 18/564,947

(22) PCT Filed: Dec. 8, 2022

(86) PCT No.: PCT/EP2022/085045
§ 371 (c)(1),
(2) Date: Nov. 28, 2023

(87) PCT Pub. No.: WO2023/198298
PCT Pub. Date: Oct. 19, 2023

(65) Prior Publication Data
US 2024/0239063 A1    Jul. 18, 2024

(51) Int. Cl.
*B29C 73/16*    (2006.01)
(52) U.S. Cl.
CPC .................. *B29C 73/166* (2013.01)
(58) Field of Classification Search
CPC ... B29C 73/166; B29C 73/163; B60C 29/062; B29D 2030/0686; B29D 2030/0687;
(Continued)

(56) References Cited

U.S. PATENT DOCUMENTS

| 6,386,255 B1 | 5/2002 | Majumdar et al. |
| 2008/0029181 A1 | 2/2008 | Marini |

(Continued)

FOREIGN PATENT DOCUMENTS

| AU | 2022211147 A1 | 7/2022 |
| CN | 106457934 A | 2/2017 |

(Continued)

OTHER PUBLICATIONS

Examination Report for CN application No. 202280014753.0, dated Jan. 30, 2024.

(Continued)

*Primary Examiner* — S. Behrooz Ghorishi
(74) *Attorney, Agent, or Firm* — Barnes & Thornburg LLP

(57) ABSTRACT

A tire repair device for attachment to a vehicle wheel may include a carrier element having a first side facing the vehicle wheel and a second side facing away from the vehicle wheel, a compressor attached to the carrier element, a drive mechanism operably connected to the compressor, a sealant container, fluidly coupled to the compressor, containing a tire sealant, a connection line configured to be fluidly connected to the sealant container and to a tire mounted to the vehicle wheel, and a plurality of mounting elements attached to the first side of the carrier element such that positions of the mounting elements correspond to respective positions of a plurality of wheel nuts or wheel bolts along the vehicle wheel. The end section of each mounting element is configured to retentively engage with a head of a respective one of the plurality of wheel nuts or wheel bolts.

16 Claims, 5 Drawing Sheets

(58) Field of Classification Search
CPC .... B29D 2030/0689; B29D 2030/0698; B29D 30/0685
See application file for complete search history.

(56) References Cited

U.S. PATENT DOCUMENTS

| | | |
|---|---|---|
| 2012/0234447 A1 | 9/2012 | Narloch et al. |
| 2018/0186197 A1 | 7/2018 | Tsiberidou et al. |
| 2018/0222137 A1* | 8/2018 | Shemesh ............... F16F 15/324 |
| 2019/0023091 A1* | 1/2019 | Spindler ................. F04C 18/22 |
| 2019/0143765 A1 | 5/2019 | Richardson |
| 2020/0070450 A1 | 3/2020 | Tsiberidis |

FOREIGN PATENT DOCUMENTS

| | | |
|---|---|---|
| CN | 105722669 A | 8/2017 |
| CN | 107405844 A | 11/2017 |
| CN | 108496002 A | 9/2018 |
| CN | 111886143 A | 11/2020 |
| DE | 202005017071 U1 | 3/2007 |
| DE | 202005021981 U1 | 3/2012 |
| DE | 202015005253 U1 | 8/2015 |
| DE | 102015115642 A1 | 3/2017 |
| DE | 102016119272 A1 | 4/2018 |
| DE | 102016122735 A1 | 5/2018 |
| DE | 102021101463 A1 | 7/2022 |
| EP | 0972616 A2 | 1/2000 |
| EP | 1914062 A1 | 4/2008 |
| JP | 2003026217 A | 1/2003 |
| JP | 2018510094 A | 4/2018 |
| WO | 02066236 A1 | 8/2002 |
| WO | 2015070998 A1 | 5/2015 |
| WO | 2016138972 A1 | 9/2016 |
| WO | 2017049075 A3 | 5/2017 |
| WO | 2018134005 A1 | 7/2018 |
| WO | 2019143814 A1 | 7/2019 |

OTHER PUBLICATIONS

PCT International Search Report and Written Opinion completed by the ISA/EP on Apr. 28, 2022 and issued in connection with PCT/EP2022/051553.
Official Action dated Aug. 11, 2021 and issued in connection with DE 10 2021 101 463.8.
International Preliminary Report on Patentability completed by the ISA/EP on Nov. 18, 2022 and issued in connection with PCT/EP2022/051553.
PCT International Search Report and Written Opinion completed by the ISA/EP on Jul. 17, 2023 and issued in connection with PCT/EP2022/085045.
Office Action for copending Chinese application CN202280044199.0, mailed Oct. 19, 2024.

* cited by examiner

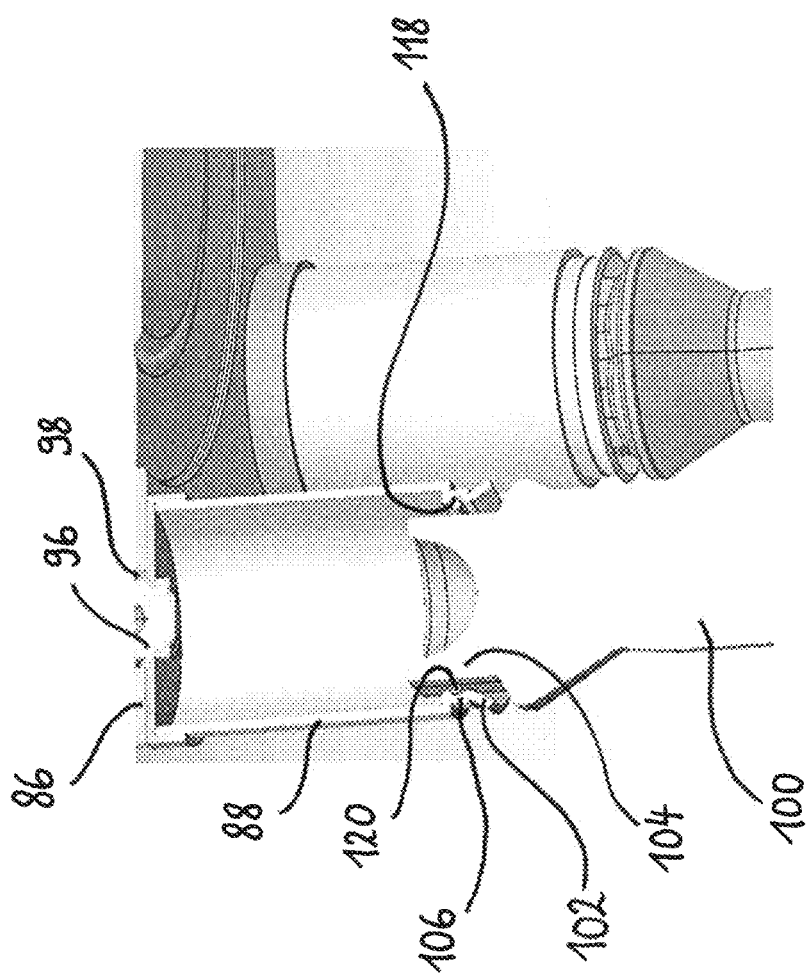
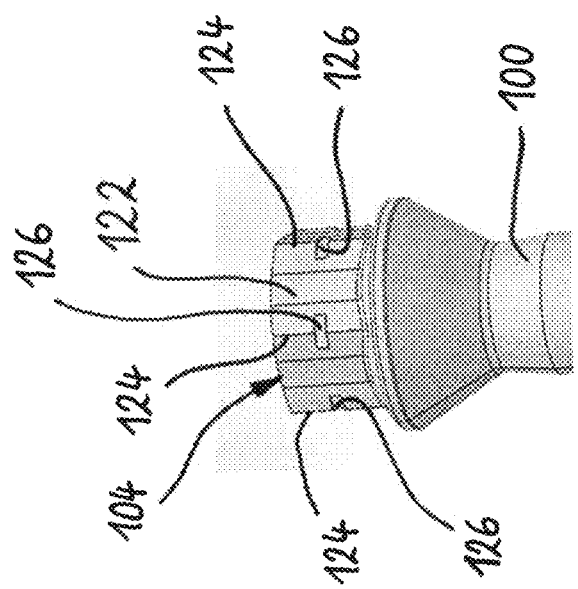
Fig. 8a
Fig. 8b

TIRE REPAIR APPARATUS FOR ATTACHMENT TO A VEHICLE WHEEL

CROSS-REFERENCE TO RELATED APPLICATIONS

This is a national stage entry of International Patent Application No. PCT/EP2022/085045, filed Dec. 8, 2022, the disclosure of which is expressly incorporated herein by reference in its entirety.

FIELD

The invention relates to the field of tire repair devices for motor vehicle wheels.

BACKGROUND AND SUMMARY

Previously it was customary to a large extent to equip motor vehicles with a spare wheel. Such a spare wheel allows onward travel in the event of a puncture by replacing the defective vehicle wheel by the spare wheel also carried. Replacement of a vehicle wheel that has become defective due to a flat tire, however, requires the vehicle to be lifted by means of a car jack, the defective vehicle wheel to be removed from the vehicle, then the spare wheel to be fitted and finally the defective vehicle wheel to be stowed in the vehicle.

To reduce this effort and also for reasons of weight saving, motor vehicles have been increasingly equipped in more recent times with a tire repair device instead of a spare wheel. A tire repair device of this kind, which is known to persons skilled in the art also by the name "Tirefit", is usually to be found below the trunk floor of a motor vehicle and comprises a sealant container including a liquid tire sealant, and an electrically driven air compressor. In the case of a puncture, such a tire repair device, which is usually box-shaped, is taken out of the vehicle trunk and placed next to the defective vehicle wheel. A connection hose of the tire repair device is then connected to the tire valve of the defective vehicle wheel. Finally, a plug of a power supply cable of the tire repair device is plugged into a socket on the vehicle, which may be a cigarette lighter socket of the vehicle, for example. The tire repair device is then turned on and causes the air compressor to pump the tire sealant into the defective vehicle tire and to re-pressurize the vehicle tire so that the journey can be continued. Beforehand, however, the tire repair device must be disconnected from the now repaired vehicle wheel and stowed in the vehicle.

The object of the invention is to provide a tire repair device which is improved compared with the tire repair devices of the "Tirefit" type and the application of which is even simpler and more foolproof in the case of a puncture.

This object is achieved according to the invention by a tire repair device. In contrast to the known tire repair devices of the "Tirefit" type, the tire repair device according to the invention is configured to be mounted to a vehicle wheel that is attached to a vehicle by wheel nuts or wheel bolts. The latter applies to the overwhelming majority of all motor vehicles. Four or five wheel nuts or wheel bolts are usually used to attach a vehicle wheel to a vehicle. Such wheel nuts or wheel bolts consist of steel and are accessible from the outside of a vehicle wheel in order to be able to fit the vehicle wheel onto the vehicle and to remove it from the vehicle. The tire repair device according to the invention has a carrier element, which may be formed at least approximately plate-shaped and associated with which is a center line and a circumferential direction. In the case of a tire repair device mounted to a vehicle wheel, the center line of the carrier element preferably represents an extension of the center line of the vehicle wheel. In the case of a tire repair device mounted to a vehicle wheel, the circumferential direction of the carrier element corresponds to the circumferential direction of the vehicle wheel. The carrier element has a side facing the wheel and a side facing away from the wheel, related in each case to an attached state of the tire repair device to a vehicle wheel. The carrier element may be a sheet steel component, for example, which has been produced by a punching and/or pressing and/or deep-drawing process. The outer shape of the carrier element is preferably at least approximately circular and substantially flat, so that the carrier element can be inserted satisfactorily into the space available in the center of a vehicle wheel.

The carrier element, which can also be referred to as a structural component, serves as a supporting component of the tire repair device. Attached to the carrier element is a compressor, which is used to draw in and pressurize air in a known manner, in order to convey a tire sealant into a defective vehicle tire using the pressurized air and to build up pressure in the vehicle tire. The compressor can be of any type suitable for said purpose. In exemplary embodiments of the tire repair device according to the invention, the compressor is a piston compressor, preferably a piston compressor with a double-acting piston.

Connected operationally to the compressor is a drive mechanism for the compressor. The compressor drive mechanism can likewise be of any type suitable for said purpose. For example, the compressor drive mechanism can be a hydraulically or pneumatically driven motor. In preferred embodiments of the inventive tire repair device, the compressor drive mechanism is an electric motor.

The inventive tire repair device further comprises a sealant container to accommodate a tire sealant, which container is connected to the compressor in a fluid-conducting manner. The tire repair device further comprises a connection line that is configured to be connected in a fluid-conducting manner to the sealant container and to a tire to be repaired. This connection line can be a separate part or can already be connected to the tire repair device at one end and then only needs to be connected to the tire to be repaired in the case of a puncture, usually by connecting the connection line to the tire valve of the defective vehicle wheel. The connection line may contain a non-return valve to prevent air flowing out of the tire into the tire repair device. Such a non-return valve also prevents an escape of air and sealant from a tire repaired by means of the tire repair device if the connection line should become detached from the tire repair device, for example during onward travel following a tire repair.

For easy attachment to a vehicle wheel, the tire repair device according to the invention has a number of sleeve-shaped mounting elements, which each have an attachment end and a free end. The sleeve-shaped mounting elements are connected at their attachment end to the carrier element and each extend from the side of the carrier element facing the wheel to their free end along a longitudinal axis parallel to the center line. The sleeve-shaped mounting elements are spaced at a distance from one another in the circumferential direction of the carrier element, wherein the positions of the sleeve-shaped mounting elements correspond at least approximately to positions of wheel nuts or wheel bolts with which a vehicle wheel to be repaired is attached to a vehicle. The number of sleeve-shaped mounting elements preferably corresponds to the number of wheel nuts or wheel bolts with which the vehicle wheel is attached to the vehicle, but fewer mounting elements than wheel nuts or wheel bolts may also be provided, especially if a vehicle wheel is attached by many wheel nuts or wheel bolts. For example, three sleeve-shaped mounting elements may suffice to attach an inventive tire repair device securely to a vehicle wheel.

An end section of each sleeve-shaped mounting element adjacent to the free end is configured to engage retentively with a head of a wheel nut or wheel bolt. Here "retentively engage with" means that the sleeve-shaped mounting elements of an inventive tire repair device are put onto the related heads of the wheel nuts or wheel bolts of the vehicle wheel to be repaired and then automatically retain the tire repair device on the vehicle wheel. By "correspond at least approximately to positions of wheel nuts or wheel bolts" it is meant that the sleeve-shaped mounting elements can be attached to the carrier element with play in a lateral direction, i.e., radially with respect to their longitudinal axis, wherein this lateral play enables a sleeve-shaped mounting element, when placed onto the associated wheel nut or wheel bolt, to center itself automatically on this wheel nut or wheel bolt. Embodiments of the inventive tire repair device in which some or all sleeve-shaped mounting elements are supported with lateral play can be attached to different types of vehicle wheels because the sleeve-shaped mounting elements can adjust in the context of their lateral play to different bolt circles and bolt positions. However, if a tire repair device is intended only for a certain vehicle, on which the positions of the wheel nuts or wheel bolts are precisely known, the sleeve-shaped mounting elements may be mounted even without lateral play exactly at those positions which correspond to the positions of the wheel nuts or wheel bolts.

A tire repair device according to the invention can be mounted quickly and easily to a vehicle wheel to be repaired without any parts such as a hub cap, for example, having to be removed beforehand. Mounting an inventive tire repair device to the vehicle wheel is carried out in a simple manner by simply pushing its sleeve-shaped mounting elements onto associated heads of wheel nuts or wheel bolts with which the vehicle wheel is attached to the vehicle. Then, only the connection line needs to be connected to the vehicle wheel to be repaired, for example by screwing a free end of the connection line onto the tire valve of the vehicle wheel, and if applicable the other end of the connection line must still be connected to the tire repair device (if this other end is not already fixedly connected to the tire repair device). Following use of the tire repair device according to the invention, it may remain on the vehicle wheel during the onward journey, as it is held securely on the vehicle wheel by the sleeve-shaped mounting elements.

To make it easier to attach the inventive tire repair device to a vehicle wheel, the free end of each sleeve-shaped mounting element is provided with a funnel-shaped widening on preferred embodiments. Here, each sleeve-shaped mounting element is preferably supported rotatably about its longitudinal axis. Thus, the sleeve-shaped mounting element can center itself even more easily on the associated wheel nut or wheel bolt. According to a particularly preferred embodiment, the funnel-shaped widening of each sleeve-shaped mounting element has guide surfaces on its inside in the form of helical segments, which upon contact with a head of the associated wheel nut or wheel bolt center the sleeve-shaped mounting element on this head by corresponding rotation, which is triggered by the engagement between the guide surfaces in the form of helical segments and the head. Here, the end section adjacent to the free end of each sleeve-shaped mounting element can have an inner cross-sectional shape that corresponds to the outer cross-sectional shape of the head of the wheel nut or wheel bolt. Heads of wheel nuts or wheel bolts usually have a hexagonal outer cross section, so that then the inner cross section of the end section of each sleeve-shaped mounting element may likewise be implemented hexagonally. Such a corresponding shape of the cross section of the end section of each sleeve-shaped mounting element improves the mechanical engagement of the end section with the associated head of a wheel nut or wheel bolt.

The end section of each sleeve-shaped mounting element can engage retentively with a head of a wheel nut or wheel bolt in various ways. For example, the end section can be provided on its inner side with a series of successive catch projections following each other in a longitudinal direction, which, when the sleeve-shaped mounting element is pushed onto the head of a wheel nut or wheel bolt, engage with this head in a locking or clamping manner. According to one embodiment, a lock washer, often also termed a snap ring, is fitted and held in the end section of the sleeve-shaped mounting element. The internal diameter of this lock washer or snap ring is somewhat smaller than the outer diameter of the head of a wheel nut or wheel bolt with which the end section of the sleeve-shaped mounting element is to engage. When the end section is pushed onto the head of the wheel nut or wheel bolt, the lock washer expands and can then latch into locking recesses present on the circumferential surfaces of the head of the wheel nut or wheel bolt. In this way, the tire repair device is held securely on the vehicle wheel.

In other configurations of an inventive tire repair device, which may also be combined with the aforesaid embodiment, a magnet is attached in the end section of each sleeve-shaped mounting element, which magnet is able to adhere to a head of a wheel nut or wheel bolt by magnetic interaction. The magnet is preferably spring-mounted in the direction of the longitudinal axis of the sleeve-shaped mounting element and is spring-preloaded towards the free end of the sleeve-shaped mounting element. The magnet is particularly preferably displaceable in the end section of the sleeve-shaped mounting element against the spring preloading into a number of successive locking positions along the longitudinal axis. When the sleeve-shaped mounting elements of an inventive tire repair device are placed onto the associated heads of wheel nuts or wheel bolts, a user thus receives haptic feedback on the placement process, which can be used to signal correct placement. For example, a user can be instructed to place the tire repair device so far onto the heads of the wheel nuts or wheel bolts until he/she can detect three consecutive clicks. Moreover, the locking positions prevent the magnet in the end section of the sleeve-shaped mounting element moving unintentionally into the sleeve-shaped mounting element against the spring preloading.

The magnet mounted in the end section of each sleeve-shaped mounting element is preferably disc-shaped or cylinder-shaped. Its outer shape may be circular or may correspond to the outer shape of the head of the wheel nut or wheel bolt. The outer shape of the magnet may thus be hexagonal, for example.

To amplify the magnetic effect, each magnet may be received in a component focusing the force lines, which ensures that the magnetic flux lines of the magnet are concentrated on the associated head of a wheel nut or wheel bolt, in order thus to amplify the magnetic interaction and thus the holding force.

In conventional tire repair devices of the "Tirefit" type, the tire sealant is a single liquid. A tire sealant of this kind has only a limited service life, however, and thus a correspondingly time-limited period of use. To overcome this disadvantage, the sealant container in preferred embodiments of the inventive tire repair device has two separate chambers for two components of a tire sealant as well as a mixing chamber for mixing these two components. Due to the separate storage of two components of a tire sealant enabled thereby, ageing of the tire sealant no longer occurs or occurs only extremely slowly, which is why the usability of a tire repair device equipped in such a way is maintained for a much longer period. Only when the tire repair device is used are the two components pumped, by means of the compressor, from the two separate chambers into the mixing chamber, are mixed there and are then conducted into the tire to be repaired. This mixing chamber is preferably located at a point that is directly upstream of a connection for the connection line. The mixed tire sealant is then conveyed through the connection line into the tire to be repaired. If required by the tire sealant used, even more than two chambers can be present for components of a tire sealant in the sealant container. It is likewise possible to provide just a single chamber for the tire sealant in the sealant container if the tire sealant used comprises only one component. A mixing chamber for mixing several components of the tire sealant can then be omitted.

In advantageously configured embodiments of the inventive tire repair device, the sealant container forms a housing of the tire repair device which covers the carrier element and the compressor. Since the inventive tire repair device, due to being attached to the wheel nuts or wheel bolts of the vehicle wheel to be repaired, is mounted in the center of the vehicle wheel, it lends itself to execute the carrier element with an at least approximately round outer circumference. A sealant container designed as a housing then preferably likewise has a round outer shape and is furthermore flattened so as to protrude as little as possible from the vehicle wheel in an axial direction.

So that an inventive tire repair device may be put into operation as quickly and easily as possible, the tire repair device preferably comprises an energy storage for operating the compressor drive mechanism, which storage is operationally connected to the compressor drive mechanism. Such an energy storage may be a compressed air vessel, for example, if the drive mechanism is a pneumatically operable motor. The energy storage is preferably implemented as a battery or a plurality of batteries, however, wherein the electrical energy stored in the battery or batteries is used to drive an electric motor, which forms the drive mechanism for the compressor. The battery or plurality of batteries may be rechargeable or non-rechargeable batteries. Alternatively, or also in addition, the inventive tire repair device may have a connection enabling it to supply it with external energy (in particular current). For example, a connector may be present on the tire repair device, which may be connected by means of a power cable to e.g., a cigarette lighter in the vehicle or to a power bank, in order to make it possible in this way to operate the tire repair device using external energy.

To prevent an inventive tire repair device from starting to operate unintentionally or prematurely, the connection line in preferred embodiments of the tire repair device has, at an end to be connected to the tire to be repaired, a monitoring switch, which enables operation of the drive mechanism only if the end of the connection line to be connected to the tire to be repaired is actually connected to the tire. For example, this monitoring switch can be a microswitch, which is actuated when the free end of the connection line is screwed onto the tire valve of the vehicle wheel to be repaired and thereby signals to a control device of the tire repair device that the connection line is correctly connected to the vehicle wheel to be repaired. The tire repair device can then be put into operation or commences operation automatically.

It has already been mentioned that the drive mechanism of an inventive tire repair device is preferably an electric motor. For space-saving and protective accommodation, such an electric motor is arranged in preferred exemplary embodiments in a plate-shaped recess on the side of the carrier element facing the wheel, wherein this recess is preferably located in a center of the carrier element and thus also in the center of the vehicle wheel to be repaired.

BRIEF DESCRIPTION OF THE DRAWINGS

Exemplary embodiments of an inventive tire repair device are explained in greater detail below based on the enclosed schematic figures. These show:

FIG. 8a a three-dimensional sectional representation of another embodiment of an inventive tire repair device; and FIG. 8b a three-dimensional representation of the head of a wheel bolt, which is modified for use with the embodiment shown in FIG. 8a.

DETAILED DESCRIPTION

Figure 1:
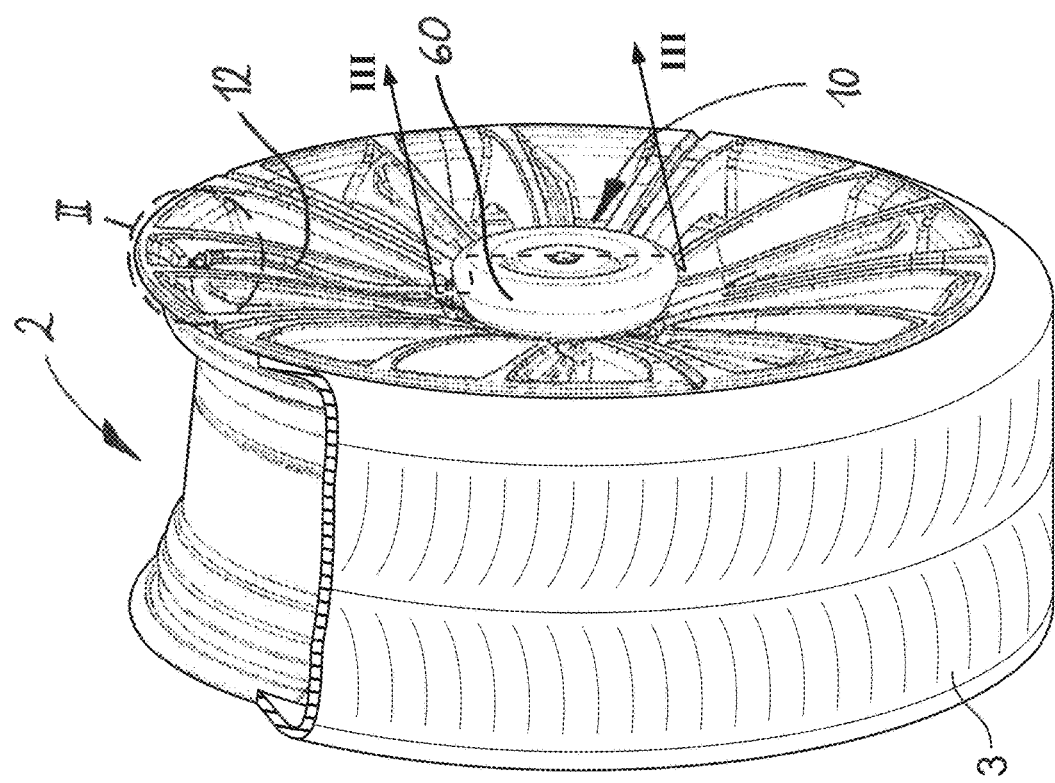
FIG. 1 a vehicle wheel rim in a three-dimensional view with an inventive tire repair device mounted thereto.

In FIG. 1, a vehicle wheel is shown in a three-dimensional representation, wherein a conventional tire 3 is shown mounted to a vehicle wheel rim 2. The vehicle wheel is attached to a vehicle by means of wheel nuts or wheel bolts, this vehicle not being shown for reasons of simplicity. Mounted to an outside of the vehicle wheel rim 2 is a tire repair device, generally designated as 10, the structural design of which and attachment to the vehicle are explained in greater detail below.

Figure 2:
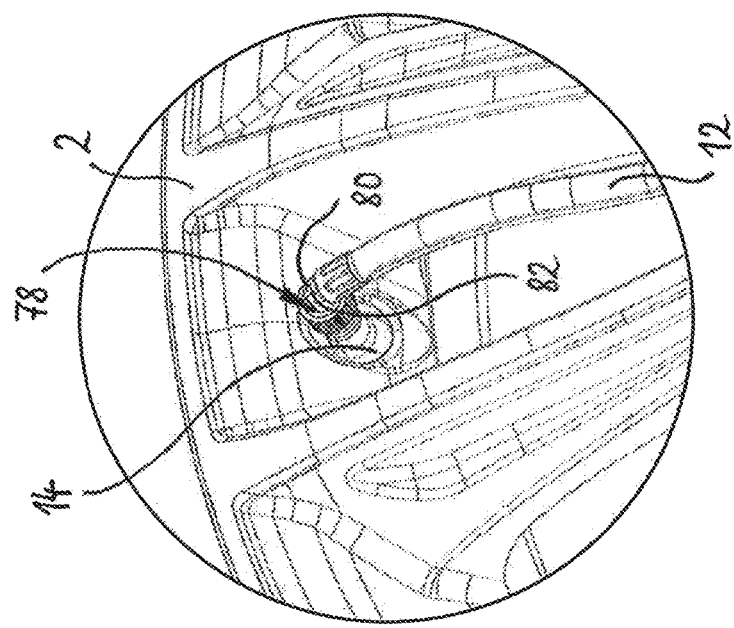
FIG. 2 an enlarged representation of region II in FIG. 1.

Similar to known tire repair devices of the "Tirefit" type, the tire repair device 10 contains a tire sealant, which may be conveyed into a tire to be repaired through a connection line 12. It is shown in FIG. 2 how a free end of the connection line 12 on the tire side may be connected to a tire (not shown) to be repaired. In the exemplary embodiment as shown, the tire-side end of the connection line 12 is connected to the tire by screwing it onto a tire valve 14, wherein the tire valve 14 is mounted to the vehicle wheel rim 2 in proximity to an outer circumferential edge of the latter, as is common with tubeless tires.

The structural design of the tire repair device 10 is now explained in more detail with reference to FIGS. 3 to 5. The tire repair device 10 has as a structural component a carrier element 16, which is here substantially plate-shaped and has a side 18 facing the wheel and a side 20 facing away from the wheel (see in particular FIG. 4). The carrier element 16 consists here of sheet steel, but may also be manufactured from a plastic, in particular a fiber-reinforced plastic or another suitable material. On the side 20 of the carrier element 16 facing away from the wheel, in a central region thereof, a compressor 22 for generating compressed air is attached. To drive the compressor 22, an electric motor 24 is used in the exemplary embodiments shown, which motor is received on the side 18 of the carrier element 16 facing the wheel in a plate-shaped recess 26, which is formed in a central region of the carrier element 16. The electric motor 24 has an output shaft 32 rotatably supported in two bearings 28, 30, which shaft passes through the carrier element 16 and is connected at its end facing the compressor 22 to an eccentric cam 34. The eccentric cam 34 interacts with a piston 36 of the compressor 22 by engaging in a suitably formed opening 38 of the piston 36 and moving the piston 36 back and forth in the compressor 22 when the output shaft 32 is rotating. The piston 36 in the exemplary embodiments shown here is what is referred to as a double-acting piston, i.e., each stroke of the piston 36 is a working stroke with which compressed air is produced. This can be recognized particularly clearly in FIG. 5, in which the compressor 22 is represented in longitudinal section.

Figure 5:
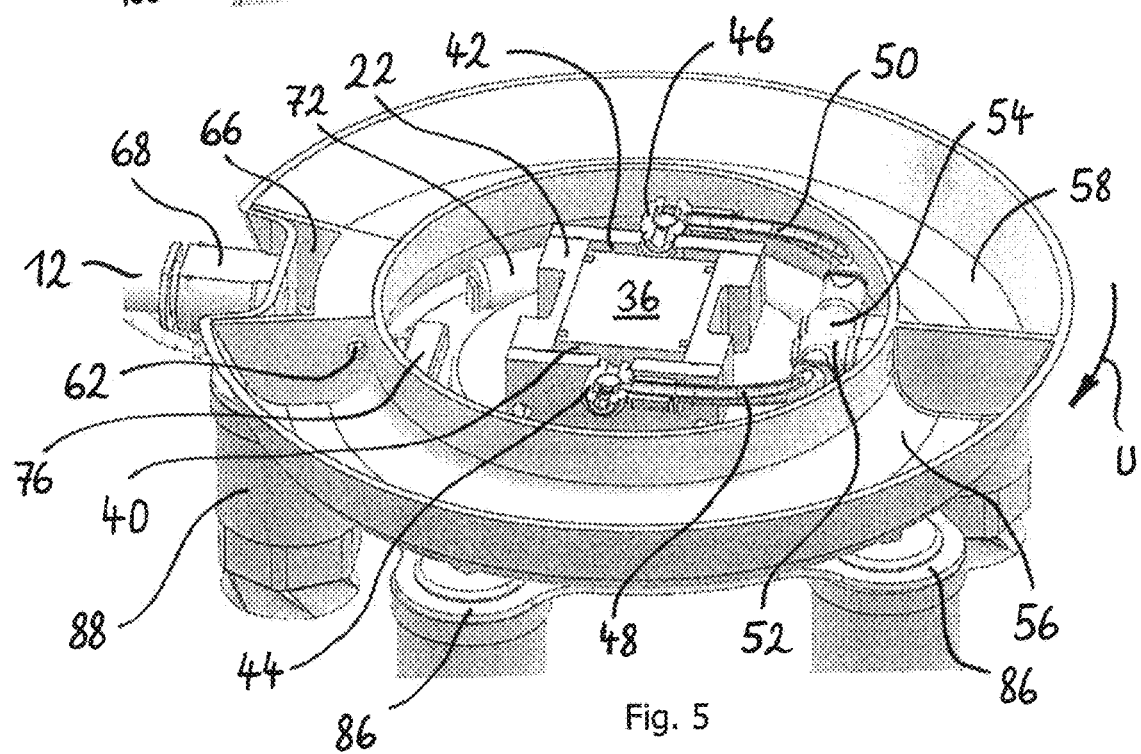
FIG. 5 another three-dimensional view of the tire repair device shown in FIG. 4 from obliquely above, sectioned in a plane perpendicular to the center line A shown in FIG. 4.

With reference to in particular FIG. 5, the basic function of a tire repair device 10 is now described in greater detail. In the compressor 22, two pressure chambers 40, 42 are formed, in which compressed air may be generated by the reciprocating movement of the piston 36. Each pressure chamber 40, 42 is provided with a valve 44, 46, through which air is drawn into the respective pressure chamber 40 or 42 in the suction stroke of the piston 36, and through which compressed air generated in the pressure stroke of the piston 36 is delivered from the pressure chamber 40 or 42 to a pressure line 48 or 50, which connects the compressor 22, more accurately its pressure chambers 40 and 42, to pressure supply valves 52 and 54, which are associated with a first chamber 56 and a second chamber 58 of a sealant container 60. Both the valves 44 and 46 and the pressure supply valves 52 and 54 may be designed as simple non-return valves.

The sealant container 60 serves to take up a tire sealant (not shown), which in the event of a puncture (tire loses air or is flat) is pumped from the sealant container 60 through the connection line 12 into the tire to be repaired by the compressed air produced by the compressor 22. To avoid premature ageing of the tire sealant, this tire sealant, in the exemplary embodiments of the tire repair device 10 shown here, consists of two components, of which one component is stored in the first chamber 56 and the other component in the second chamber 58 of the sealant container 60. When the tire repair device 10 is used, the two components of the tire sealant are pressed by the compressed air, which is produced by the compressor 22 and supplied via the pressure supply valves 52 and 54 to the chambers 56, 58, through outlets 62 and 64 into a mixing chamber 66, which is here likewise part of the sealant container 60 and is located directly upstream of a housing-side connection 68 of the connection line 12. The outlets 62 and 64 may be provided, as may be seen in FIG. 3 and FIG. 4, with a swirl-forming inner wall 70 in order to create a swirled flow of the two components of the tire sealant flowing through the outlets 62, 64, which better and more quickly enables their thorough mixing in the mixing chamber 66. The thoroughly mixed tire sealant is then pressed out of the mixing chamber 66 through the connection 68 on the housing side into the connection line 12 and through the tire valve 14 into the tire to be repaired. After the tire sealant has been fully pumped into the tire to be repaired, the compressor 22 continues to generate compressed air to inflate the tire and thereby return it to a drivable state.

To supply energy to the electric motor 24, a number of batteries 72 are used in the exemplary embodiments shown, which batteries are arranged on a printed circuit board 74, which is annular here and is mounted around the plate-shaped recess 26 on the side 20 of the carrier element 16 facing away from the wheel. The batteries 72 may be rechargeable or non-rechargeable batteries and instead of the number of batteries 72 shown here, fewer or more batteries can of course also be used. Also arranged on the printed circuit board 74 is an electronic control unit 76, which controls the function of the tire repair device 10. So that tire sealant does not emerge unintentionally or prematurely from the connection line 12, the exemplary embodiments shown here are provided at the tire-side end of the connection line 12 with a monitoring switch 78, which is actuated when the tire-side end of the connection line 12 is screwed onto the tire valve 14 and thereby indicates that the tire repair device 10 is correctly connected to a tire to be repaired. The signal of the monitoring switch 78 is conducted to the control unit 76 via electrical lines 80, 82. Only when the signal of the monitoring switch 78 indicates a correct connection to the tire valve 14 can the compressor 22 and thus the tire repair device 10 be put into operation. This putting into operation may be done manually, for example via a switch (not shown) to be operated by a user, or also automatically, for example activated by the signal sent by the monitoring switch 78.

In the exemplary embodiments shown, the sealant container 60 forms a housing of the tire repair device 10 that covers in particular the carrier element 16 and the compressor 22. Here, the sealant container 60 has an at least approximately toroidal shape with a flattened outer side and is attached to the compressor 22 by a screw 84. The carrier element 16, in the exemplary embodiments shown, has a circular basic shape with a number of flap-like extensions 86 mounted on the outer circumference, the purpose of which extensions will be understood from the following description.

The mounting of the tire repair device 10 to a vehicle wheel will now be explained. For mounting to a vehicle wheel, the tire repair device 10 is provided with a number of sleeve-shaped mounting elements 88 spaced at a distance from one another in the circumferential direction U, each of which elements has an attachment end 90 and a free end 92. Each sleeve-shaped mounting element 88 is connected by its attachment end 90 to the carrier element 16, here by an attachment screw 94, which runs through the associated flap-like extension 86 of the carrier element 16. Each sleeve-shaped mounting element 88 respectively extends from the side 18 of the carrier element 16 facing the wheel to its free end 92 along a longitudinal axis L parallel to the center line A. In the exemplary embodiments shown, each sleeve-shaped mounting element 88 is rotatably supported about its longitudinal axis L in that the attachment screw 94 extending through the associated flap-like extension 86 does not brace the sleeve-shaped mounting element 88 against the carrier element 16, but upon tightening only comes into abutment with and is champed against an annular collar 96 formed at the attachment end 90 of the mounting element 88. Furthermore, in the exemplary embodiments shown, the diameter of an opening 98 in the flap-like extension 86 through which the attachment screw 94 runs is greater than the outer diameter of the annular collar 96, so that each sleeve-shaped mounting element 88 may move radially relative to the longitudinal axis L. Expressed another way, each sleeve-shaped mounting element 88 is received with lateral play in the carrier element 16, more precisely in the associated flap-like extension 86 of the carrier element 16.

As may be gathered from the enclosed figures, the positions of the sleeve-shaped mounting elements 88 on the carrier element 16 thus correspond at least approximately to the positions of wheel nuts or wheel bolts 100 by means of which the vehicle wheel rim 2 is mounted to the vehicle. To attach the tire repair device 10, the sleeve-shaped mounting elements 88 are aligned with the wheel bolts 100 and then placed onto the wheel bolts 100. To simplify this process, the sleeve-shaped mounting elements 88 in the exemplary embodiments shown each have a funnel-shaped widening 102 at their free end 92, which guides a head 104 of each wheel nut or wheel bolt 100 into the sleeve-shaped mounting element 88. So that the tire repair device 10 remains attached to the vehicle wheel or the vehicle wheel rim 2, an end section 106 adjacent to the free end 92 of each sleeve-shaped mounting element 88 is designed to retentively engage with the associated head 104 of a wheel nut or wheel bolt 100.

In the exemplary embodiments shown here, a magnet 108, which is disc-shaped here, is attached in the end section 106 and is drawn by its magnetic interaction with the head 104 of the wheel nut or wheel bolt 100 towards the head 104 and thereby generates a holding force. In the exemplary embodiment shown in FIG. 3, the magnet 108 is received in a cup-shaped component 110 focusing the magnetic force lines to improve the magnetic interaction, which component concentrates the magnetic force lines of the magnet 108 onto the head 104.

In the exemplary embodiments shown here, each magnet 108 is furthermore spring-mounted in the direction of the longitudinal axis L, wherein a spring 112 preloads the associated magnet 108 towards the free end 92 of the sleeve-shaped mounting element 88. To give the placement of the tire repair device 10 onto the heads 104 of the wheel nuts or wheel bolts 100 a more defined character, a locking device 114, reproduced only schematically here, is present in each sleeve-shaped mounting element 88 between the attachment end 90 and the magnet 108 in the exemplary embodiments shown, which device makes it possible to move each magnet 108, when placed onto a head 104, in a defined way against the spring preloading generated by the spring 112 into a number of successive locking positions in the longitudinal direction L. In operating instructions of the tire repair device 10 it may then be indicated, for example, that the tire repair device 10 is correctly mounted to the vehicle wheel when several consecutive "clicks", for example three or four "clicks", have been detected. The locking device 114 also prevents the magnet 108 from being pushed unintentionally into the sleeve-shaped mounting element 88.

Figure 3:
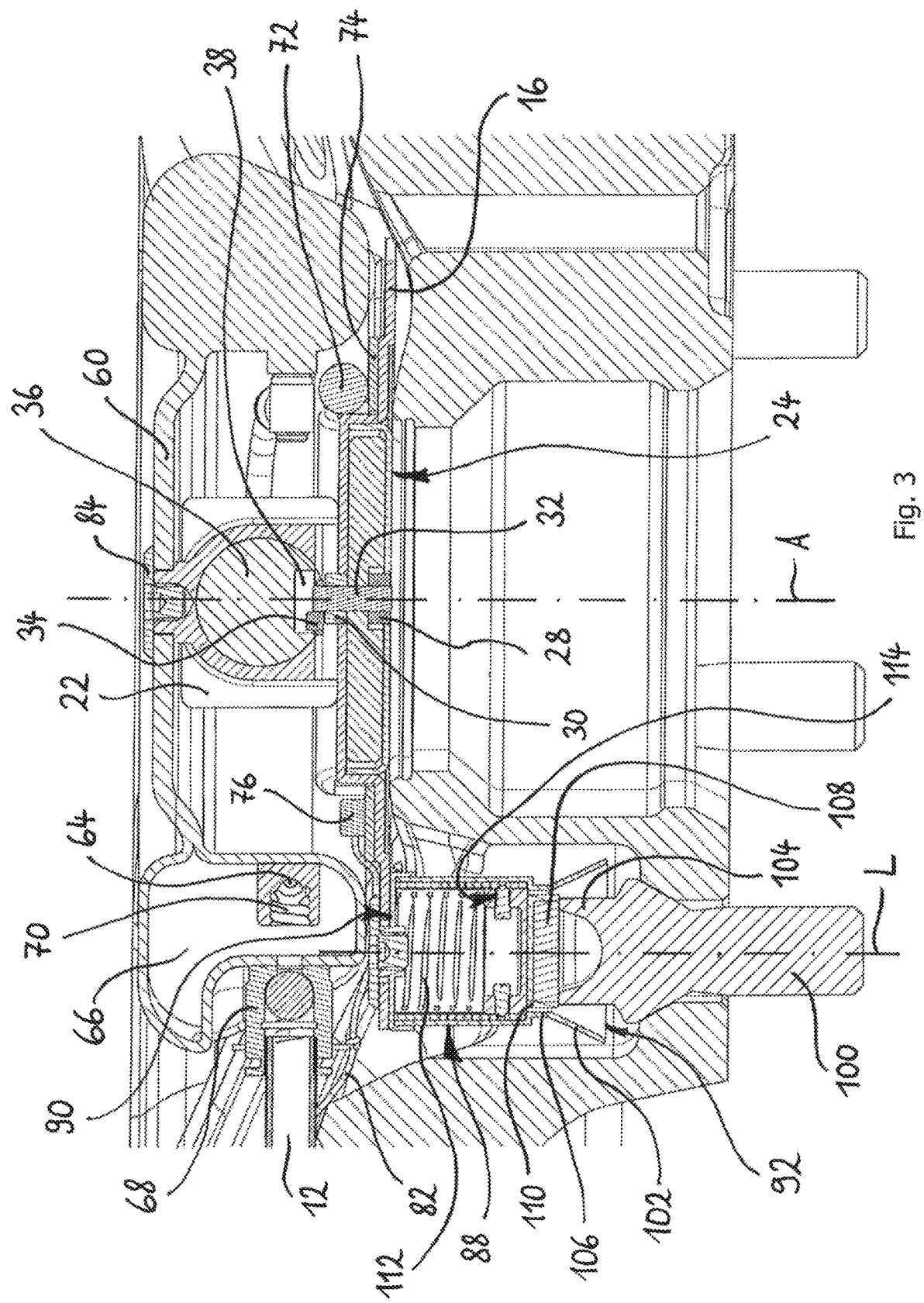
FIG. 3 a cross section through the tire repair device depicted in FIG. 1 as well as adjacent regions of the vehicle wheel rim.
Figure 4:
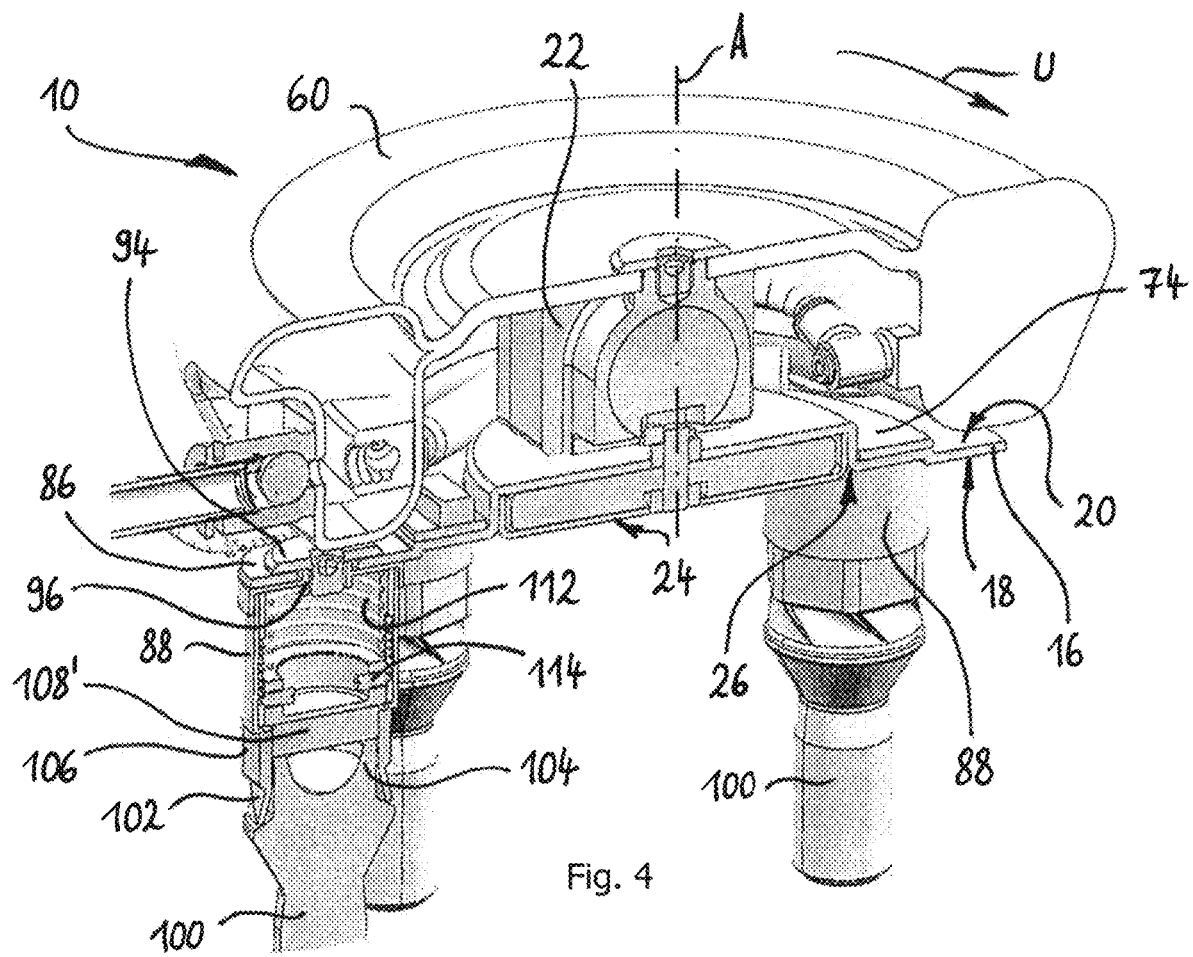
FIG. 4 a three-dimensional cross-sectional view of a slightly modified exemplary embodiment of the tire repair device shown in FIG. 3.
Figure 6:
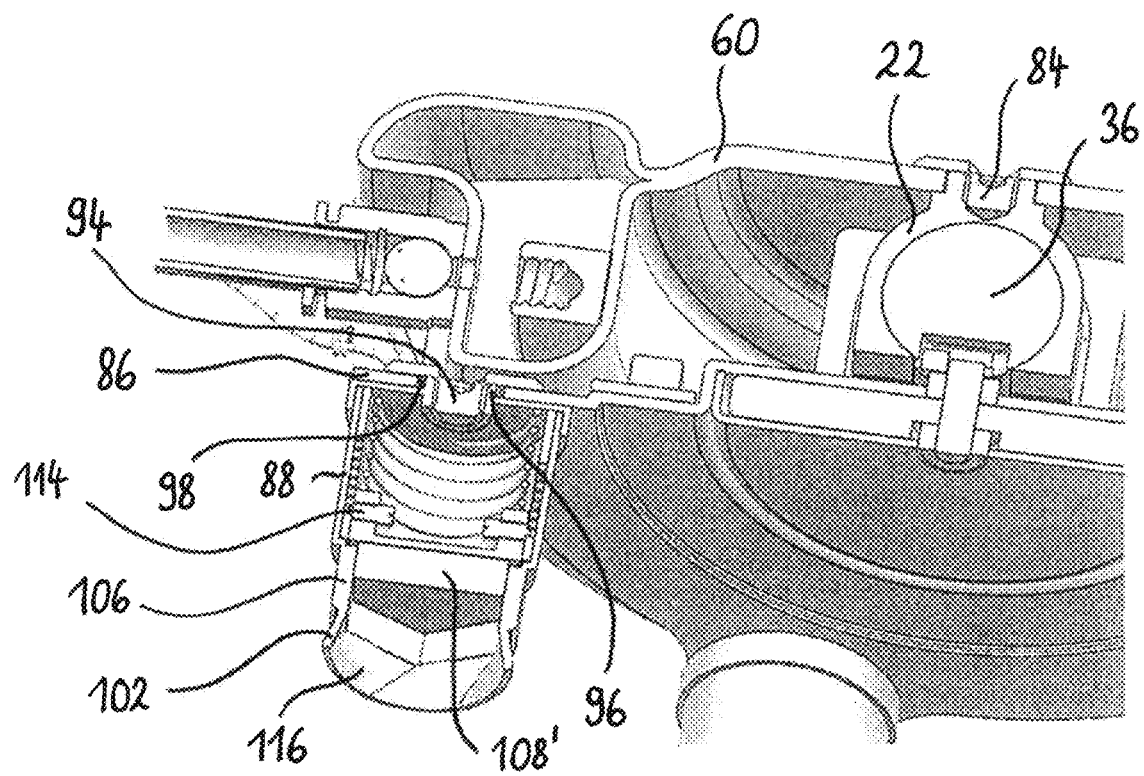
FIG. 6 a three-dimensional sectional representation of the left part of the tire repair device shown in FIG. 4 from obliquely underneath.
Figure 7:
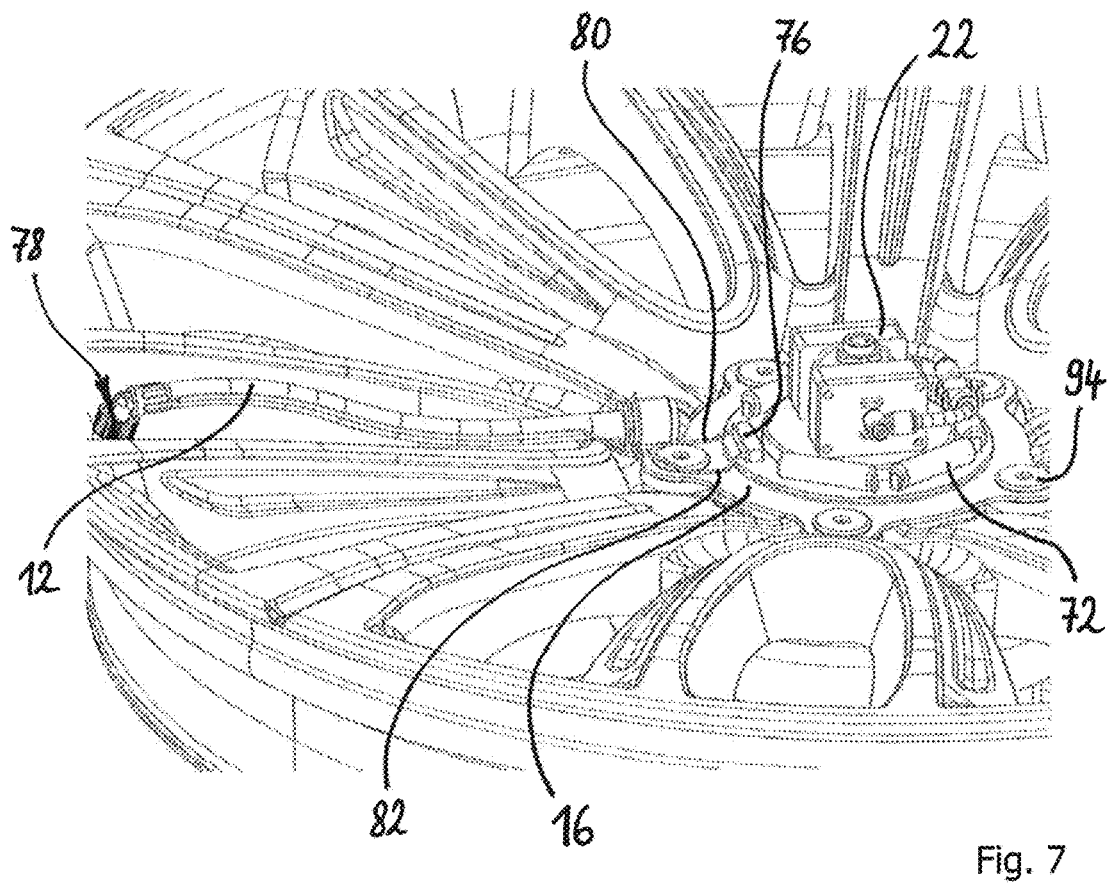
FIG. 7 a three-dimensional representation, similar to FIG. 1, of a tire repair device mounted to the vehicle wheel rim with housing removed.

The embodiment shown in FIGS. 4, 5 and 6 differs from the exemplary embodiment shown in FIG. 3 in that the funnel-shaped widening 102 at the free end 92 of each sleeve-shaped mounting element 88 is provided on its inner side with guide surfaces 116 in the form of helical segments and that the end section 106 is not executed in a circular cylindrical manner as in FIG. 3, but has a hexagonal cross section, which corresponds to the cross section of the head 104 of the wheel nut or wheel bolt 100. Upon engaging with a head 104, the guide surfaces 116 in the form of helical segments cause, if required, a rotation of the sleeve-shaped mounting element 88 about its longitudinal axis L until the position of the corners of the hexagonal cross sections of head 104 and end section 106 coincide, whereupon the end section 106 slides onto the head 104 and the magnet 108', here implemented hexagonally, comes into abutment with the upper side of the head 104. The magnetic interaction between the magnet 108' and the head 104 and thus the holding force is optimized in this way.

In the embodiments of the tire repair device 10 as shown, the number of sleeve-shaped mounting elements 88 corresponds to the number of wheel nuts or wheel bolts 100. In exemplary embodiments not shown here, the number of sleeve-shaped mounting elements 88 is smaller than the number of wheel nuts or wheel bolts 100. According to an embodiment not shown here, the tire repair device 10 has only three sleeve-shaped mounting elements 88, which are spaced at a distance from one another in a circumferential direction and the positions of which correspond to just three of the wheel nuts or wheel bolts 100 of the vehicle wheel.

FIG. 8a shows another embodiment of a sleeve-shaped mounting element 88 of the tire repair device 10 in which the end section 106 of each sleeve-shaped mounting element 88 may retentively engage with a head 104 of a wheel nut or wheel bolt 100 without a magnet 108. To this end, in the embodiment shown in FIG. 8a, a lock washer 120 is arranged and held in an annular groove 118 on the inside of the end section 106. Such a lock washer 120, also referred to as a snap ring, is interrupted at one point and springs in a radial direction. The lock washer 120 is placed with pretensioning in the annular groove and is thus held fixedly in the annular groove 118. When the sleeve-shaped mounting element 88 is pushed onto the head 104 of a wheel nut or wheel bolt 100, the lock washer 120 is pressed apart somewhat and may then slide along and on a circumferential surface 122 of the head 104. Since the head 104, in the exemplary embodiment shown, has a hexagonal cross section, the circumferential surface 122 has six corners 124.

FIG. 8b shows the head 104 of a wheel bolt 100, on which slot-shaped locking recesses 126 are formed in the region of the corners 124 of the circumferential surface 122 of the head 104, which recesses extend in the circumferential direction of the head 104. In the exemplary embodiment shown, each corner 124 is provided with a single locking recess 126, but a number of locking recesses 126 spaced from each other in the longitudinal direction L may also be provided at each corner 124, so that a number of locking positions result (not shown). On placing of the end section 106 of the sleeve-shaped mounting element 88, the lock washer 120 catches in the locking recesses 126 spaced from one another in the circumferential direction, whereby each sleeve-shaped mounting element 88 and thus the entire tire repair device 10 is securely held on the vehicle wheel rim 2.

The invention claimed is:

1. A tire repair device for attachment to a vehicle wheel, the vehicle wheel attachable to a vehicle by a plurality of wheel nuts or wheel bolts, the tire repair device comprising:
a carrier element having a center line and a circumferential direction each of which, upon attachment of the tire repair device to the vehicle wheel, correspond to a respective center line and circumferential direction of the vehicle wheel, the carrier element having a first side facing the vehicle wheel and a second side facing away from the vehicle wheel;
a compressor attached to the carrier element;
a drive mechanism operably connected to the compressor;

a sealant container, fluidly coupled to the compressor, configured to accommodate a tire sealant;

a connection line configured to be fluidly connected to the sealant container and to a tire mounted to the vehicle wheel; and a plurality of mounting elements each having an attachment end, a free end and an end section adjacent to the free end, the attachment ends of the plurality of mounting elements attached to the first side of the carrier element with each of the plurality of mounting elements extending from the first side of the carrier element along a longitudinal axis parallel to the center line, the plurality of mounting elements spaced apart from one another in the circumferential direction about the carrier element such that respective positions of the mounting elements along the carrier element correspond at least approximately to respective positions of the plurality of wheel nuts or wheel bolts along the vehicle wheel, the end section of each of the plurality of mounting elements configured to retentively engage with a head of a respective one of the plurality of wheel nuts or wheel bolts.

2. The tire repair device of claim 1, wherein the end section of each of the plurality of mounting elements is funnel shaped with increasing width in a direction toward the free end.

3. The tire repair device of claim 2, wherein each of the plurality of mounting elements is supported rotatably about a respective one of the longitudinal axes.

4. The tire repair device of claim 3, wherein the funnel-shaped end section of each of the plurality of mounting elements has an inner guide surface in the form of a helical segment configured to center the respective one of the plurality of mounting elements on a head of an associated one of the plurality of wheel nuts or wheel bolts.

5. The tire repair device of claim 1, wherein at least one of the plurality of mounting elements is radially displaceable relative to a respective one of the longitudinal axes.

6. The tire repair of claim 1, wherein mounted in the end section of each of the plurality of mounting elements is a magnet configured to magnetically adhere to the head of a respective one of the plurality of wheel nuts or wheel bolts.

7. The tire repair device of claim 6, wherein each magnet is spring-mounted to a respective one of the plurality of mounting elements in the direction of the longitudinal axis thereof, and each magnet is spring-preloaded towards the free end of the respective one of the plurality of mounting elements.

8. The tire repair device of claim 7, wherein each magnet is displaceable against the spring preloading into a number of successive locking positions in the end section of a respective one of the plurality of mounting elements.

9. The tire repair device of claim 1, wherein the sealant container comprises two separate chambers, each configured to contain a respective one of two different components of the tire sealant, and a mixing chamber for mixing the two different components.

10. The tire repair device of claim 9, wherein the mixing chamber is located directly fluidly upstream of a connection of the connection line to the sealant container.

11. The tire repair device of claim 1, wherein the sealant container comprises a housing which forms a cover over the carrier element and the compressor.

12. The tire repair device of claim 1, further comprising at least one energy storage device, operably connected to the drive mechanism, for operating the drive mechanism.

13. The tire repair device of claim 12, wherein the at least one energy storage device comprises at least one battery.

14. The tire repair device according to claim 1, wherein the connection line comprises, at an end configured to be connected to the tire, a monitoring switch to enable operation of the drive mechanism only when the end configured to be connected to the tire is connected to the tire.

15. The tire repair device according to claim 1, wherein the drive mechanism is an electric motor arranged in a plate-shaped recess formed on the first side of the carrier element.

16. The tire repair device of claim 1, wherein mounted in the end section of each of the plurality of mounting elements is a lock washer adapted to engage in a locking manner with the head of a respective one of the plurality of wheel nuts or wheel bolts.

* * * * *